Patented Aug. 7, 1928.

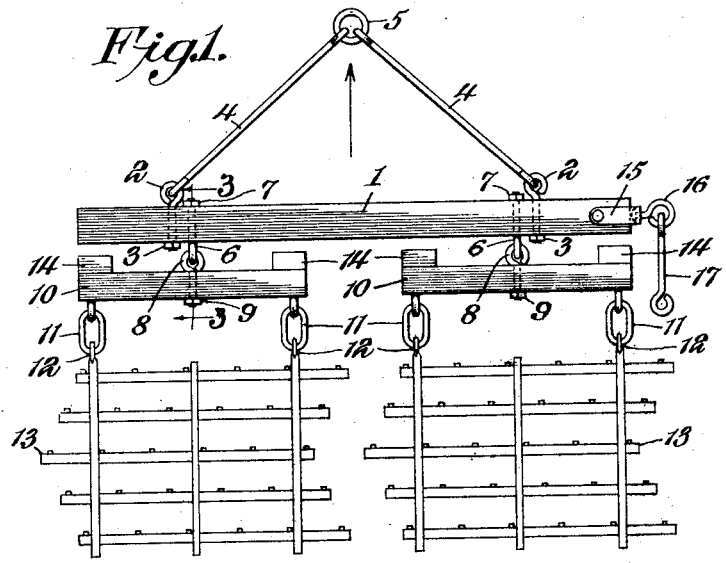

1,679,693

UNITED STATES PATENT OFFICE.

VICTOR J. TEGELER, OF HOPKINTON, IOWA.

DRAFT APPLIANCE.

Application filed November 23, 1925. Serial No. 70,895.

This invention relates to draft appliances, and is especially adapted for use in connection with harrows or similar agricultural implements or machines.

The object is to provide a simple, strong and durable device which may be easily and quickly attached to two or more harrows, disc cultivators, drags or the like, the same being arranged side by side to cover a greater area while being drawn forwardly by horse or motive power and to effect a uniform pull on the same with a single, central hitch to the source of power.

Another object is to provide a cheaply constructed draft appliance of this character which may be quickly shifted, without any special manipulation or adjustment, to allow one end of the same to be hitched to the team or tractor, whereby, when drawn forwardly in a direction longitudinally of the draft appliance, the harrows, cultivators, drags or other implements attached thereto, will automatically turn at right angles and follow one behind the other, so as to cover the minimum amount of ground, as when transporting the implement from one field to another, or to enable the same to pass through narrow gates, over bridges or through other restricted places.

A full and complete understanding of the invention may be obtained from a consideration of the following detailed description, taken in connection with the accompanying drawings forming a part of this specification; it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claim.

In the drawing, in which similar reference characters designate corresponding parts throughout the several figures:—

Figure 1 is a plan view of the invention having two ordinary toothed harrows attached thereto, and in position for harrowing a field.

Figure 2 is a similar view showing the arrangement and location of the parts when being transported or when it is desired to harrow a narrow strip of ground.

Figure 3 is a detail sectional view taken on the line 3—3 of Figure 1.

Figure 4 is a detail sectional view taken on the line 4—4 of Figure 2.

Referring to the drawing there is shown a draft appliance constructed in accordance with the present invention and adapted to draw two harrows or other implements over the ground, in side by side relation when in active position, said implements being of any style or design in use. It is to be understood, however, that the invention may be readily adapted to have three or more of such harrows attached thereto, when it is desired to work a wider strip of ground and the draft power is sufficient for the purpose, without any material change or alteration being necessary in the parts.

The invention comprises a main draft beam 1 which may be formed of a suitable stout timber, as illustrated, or the same may be formed of relatively heavy tubing or bar material of sufficient weight and strength.

Adjacent to each end of the main draft beam 1, there is applied a horizontally disposed eye-bolt 2 running transversely through the beam from front to rear thereof, and held to the same by a nut 3. The eyes of the bolts 2 are arranged at the front face of the beam, and are adapted to be engaged by the terminal eyes of draw bars or links 4 which extend forwardly and toward each other, where they are connected by other terminal eyes to a hitch ring 5, which is located at the center of the beam 1 and considerably in advance of the same for connection to a team or teams of horses or to a tractor.

Between the eye-bolts 2 there is provided another pair of eye-bolts 6, one of the latter being adjacent to each of the bolts 2 but reversely arranged with the eye of the said bolts at the rear of the beam 1 and held thereto by nuts 7. The eyes of the bolts 6 are adapted to be engaged by other eyes 8 held, as by nuts 9, to supplemental beams 10, said eyes being located at the centers of the supplemental beams, and the latter being of a length each to provide a space between their inner, opposite ends, and with their outer ends substantially flush with the adjacent ends of the main beam 1.

Each supplemental beam 10 carries adjacent to each of its ends a rearwardly extending link 11 flexibly connected to the beam so as to swing in any direction, and said links 11 are adapted to be engaged with the hooks 12 carried at the forward ends of longitudinal bars of any ordinary make of harrow 13 or other ground-working implement.

No attempt has been made to illustrate the construction of the harrows in detail, but the same are preferably of that type wherein the harrow teeth are carried by rockable bars or members which position said teeth for actively engaging the earth or allow the same to trail or drag in an inactive position when transporting the same.

With power connected to the ring 5, and with the harrows connected in the manner described, the ground may be harrowed along a strip equal to the combined widths of the two or more harrows, and the draft is equally applied to the same, and in order to prevent any undue rocking motion of the supplemental beams 10, with the eyes 6 and 8, as a pivotal point, the front faces of said supplemental beams are provided with spacing blocks or bumpers 14 secured to the ends of the same to abut against the rear face of the main beam and allow only a limited amount of such rocking movement.

The beams 1 and 10 are in the same horizontal plane when being drawn forwardly as describd in a direction at right angles to the length of the main beam as when in active position for working the ground, and when it is desired to shift the parts, as hereinbefore stated, for the purpose of moving the harrow in inactive position, from place to place, it is only necessary to make the connection of the source of power to one end of the main draft beam 1, and for this purpose one end of said beam is provided with a horizontally swinging, pivoted clevis 15, of U-shape and normally embracing the end of the beam. Said clevis carries an eye 16 swiveled thereto, and said eye is loosely connected to a link or draw bar 17, which has a terminal eye at its free end for connection to the team or teams, or to a tractor.

When the harrows are to be moved in an inactive position from one field or place to another, or when it is necessary to pass over a narrow bridge or through a gate or other similar place, the teeth of the harrows are shifted to an inclined or inactive position in a well known manner (not shown) and the source of power is disengaged from the eye 5 and connected to the link 17 at the end of the main draft beam 1. When the movement is started, the main beam 1 will rock upwardly about the pivotal connections provided by the eyes 6 and 8, into an edgewise position (as shown in Figure 2) owing to the resistance of the harrow teeth engaging the ground and holding the harrow frames relatively immovable. Such engagement will also, when the movement is started, cause the harrow frames to swing around on the ground in trailing position, one behind the other, to assume or follow the path of least resistance, owing to the inclined position of the teeth. The two harrows are now moving along a path as wide as a single harrow, and it will be seen that three or more harrows or other implements may be made to follow the same course. At this time the links 4 and ring 5 may be swung over to rest upon one of the harrows.

In hitching three harrows in a gang, the same length main draft beam 1 may be employed by moving the eye-bolts 6 nearer to the ends of the beam and attaching the additional supplemental beam 10 to the center of the same, and when more harrows are used the main beam 1 may be longer, as will be readily understood.

From the foregoing it will be seen that a simple, cheaply manufactured, and strong and durable draft appliance has been provided for use in connection with agricultural implements which will serve to draw the latter over the ground in harrowing position to work the ground the full width of the combined harrows or other implements, and that the latter will automatically assume a trailing position, one behind the other, when the hitch of the source of power is made from the center of the main draft beam to the end of the same, no special manipulation of the parts or adjustment thereof being necessary to accomplish the purpose.

What is claimed is:—

A draft appliance for harrows or the like comprising a main draft beam, a plurality of spaced supplemental beams flexibly hinged at spaced points to the rear edge of the main beam, terminal spacing means carried by the supplemental beams to limit their rocking movement in rear of the main beam, links flexibly connected to the front of the draft beam and having their free ends connected to a central ring, flexible link connections extending rearwardly from the terminals of the supplemental bars for detachable connection with harrows to draw the latter in active position over the ground, and a swivelled clevis mounted on one end of the main draft beam for connection to the source of power whereby, when the said main beam is drawn longitudinally the same will rock into edgewise position and the supplemental beams together with the harrows will swing around beneath the same and trail one in front of the other, the main beam then assuming a position at right angles to the original position and across the tops of the supplemental beams.

In testimony that I claim the foregoing as my own, I have hereto affixed my signature.

VICTOR J. TEGELER.